(12) United States Patent
Hsu

(10) Patent No.: US 6,404,329 B1
(45) Date of Patent: Jun. 11, 2002

(54) INTERACTIVE VEHICLE-SECURITY INFORMING AND DRIVING-SECURITY PROMPT SYSTEM

(76) Inventor: Chang-Shou Hsu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/791,597

(22) Filed: Feb. 26, 2001

(51) Int. Cl.[7] ................................................. B60Q 1/00

(52) U.S. Cl. ........................ 340/438; 340/439; 340/539; 701/29

(58) Field of Search .............................. 340/426, 438, 340/439, 461, 525, 539, 988, 932, 991; 307/10.4, 10.5, 10.7; 180/168, 287; 701/1, 29, 30

(56) References Cited

U.S. PATENT DOCUMENTS

| | | | | |
|---|---|---|---|---|
| 5,408,863 A | * | 4/1995 | Sawyers et al. | 73/35 |
| 5,420,794 A | * | 5/1995 | James | 340/991 |
| 5,825,283 A | * | 10/1998 | Camhi | 340/438 |
| 6,009,355 A | * | 12/1999 | Obradovich et al. | 340/336 |
| 6,166,627 A | * | 12/2000 | Reeley | 340/426 |
| 6,253,129 B1 | * | 6/2001 | Jenkins et al. | 340/438 |

* cited by examiner

Primary Examiner—Van T Trieu
(74) Attorney, Agent, or Firm—Troxell Law Office PLLC

(57) ABSTRACT

An interactive vehicle-security informing and driving-security prompt system, comprises a vehicle communication unit communicating wirelessly to a console through a communication server. When the car has abnormal condition, the vehicle communication unit sends a signal to the console to provide informing and prompt service. The communication server provides interactive service to the vehicle communication unit communicating and the console.

1 Claim, 2 Drawing Sheets

INTERACTIVE VEHICLE-SECURITY INFORMING AND DRIVING-SECURITY PROMPT SYSTEM

BACKGROUND OF THE INVENTION

1. Field of the invention

The present invention relates to an interactive vehicle-security informing and driving-security prompt system, wherein the vehicle sends a communication signal to a data console through a wireless communication server, thus ensuring the security.

2. Description of the Prior Art

As the development of the industrial world, the vehicles become inevitable tools for transportation. However, the common people, especially female, are not familiar with maintenance acknowledge to vehicle. Therefore, it is a problem for people to check his or her vehicle once the vehicle is malfunctioned.

SUMMARY OF THE INVENTION

It is the object of the present invention to provide an interactive vehicle-security informing and driving-security prompt system, the system provides instant informing and prompt service once an abnormal condition occurs.

In one aspect of the present invention, the car has a vehicle communication unit sending data or voice wirelessly to a console by the help of a communication server. The console has communication with a plurality of factories to provide maintenance service to the car. The car is equipped with a plurality of sensor and the sensed results of the sensors are sent to the console. The console analyzes those data and informs the car owner by data or voice once an abnormality occurs. Moreover, the workman in the console contacts the car owner by telephone to maintain the car in associated maintenance factory.

In another aspect of the present invention, the vehicle communication unit adopts GSM, CDMA or other wide-band wireless communication access such as GPS, LEOS satellite.

In still another aspect of the present invention, the vehicle communication unit has a processor connected with a GPS receiver such that the car driver can access an electronic map to find nearest factory.

In still another aspect of the present invention, the vehicle communication unit is powered through a power supply with a stabilizer.

In still another aspect of the present invention, the sensor set further comprises an alcohol concentration sensor to sense the alcohol concentration for car driver.

In still another aspect of the present invention, the sensor set further comprises an engine loudness sensor with a comparator; the sensed loudness being sent to the comparator and compared with a predetermined value and the comparison result being sent to the console.

In still another aspect of the present invention, the vehicle communication unit is a mobile communication means for remotely controlling the car.

In still another aspect of the present invention, the vehicle communication unit has a memory means for recording data and parameters measured by the sensor set when the car is driving. The memory means can be removable interface card and can be mechanically inserted and extracted, or can be transmitted through wireless channel or physical cable. Therefore, the police can read the data for security examination and the memory means can be used to record the data of the policeman for the convenience of the car owner.

The various objects and advantages of the present invention will be more readily understood from the following detailed description when read in conjunction with the appended drawing, in which:

DETAILED DESCRIPTION OF THE PREFERRED EMBODIMENTS

Figures 1A, 1B:
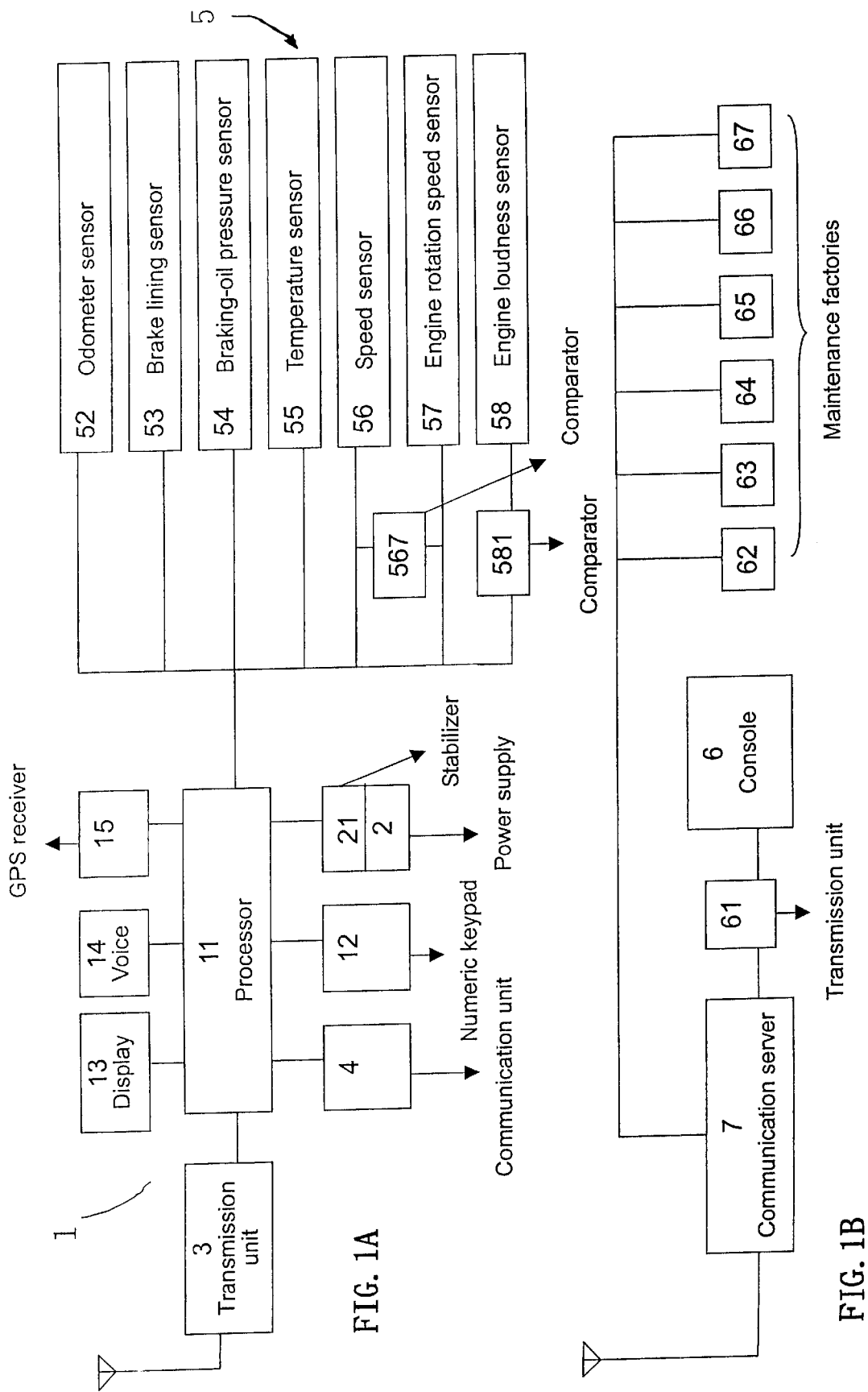
FIG. 1A is a block diagram of the vehicle communication unit of the present invention.
FIG. 1B is a block diagram of the console of the present invention.

The present invention is intended to provide an interactive (bi-directional) vehicle-security informing and driving-security prompt system. The system mainly comprises a vehicle communication unit 1, which has a processor 11, a numeric keypad 12, a display 13, a voice means 14, a sensor set 5, a communication unit 4 and a transmission unit 3, as shown in FIG. 1. The communication unit 1 is powered by a power supply 2 through a stabilizer 21.

The console 6 communicates to outside through the transmission unit 61 and a communication server 7 and has interactive communication with the vehicle communication unit 1, and has interactive data communication with the maintenance factories 62, 63, 64, 65, 66, 67. The wireless communication can be achieved by the GSM service provided by the communication server 7 or other wireless communication accesses.

For example, the wireless communication access can be GSM, CDMA or other wide-band wireless communication access such as GPS, LEOS satellite.

The operation system of the vehicle communication unit 1 can adopt Window system such as Window 95, Window 98, Window NT, Window 2000 or Linux OS.

The vehicle communication unit 1 is operated through the numeric keypad 12; the corresponding commands are generated from the processor 11 and sent to remote devices through the transmission unit 3. The communication unit 4 converts voice of user to digital representation and the digital representation is transmitted through the transmission unit 3.

The numeric keypad 12 contains only numeric keys and other simple button such as "Y" or "N" for answering.

The vehicle communication unit 1 has a display 13 for displaying text or number, and a voice unit 14 for generating alarm voice to inform car owner.

The processor 11 of the vehicle communication unit 1 is connected to a sensor set 5 comprising an odometer sensor 52, a brake lining sensor 53, a braking-oil pressure sensor 54, a temperature sensor 55, a car speed sensor 56, an engine rotation speed sensor 57 and an engine loudness sensor 58. Those sensors uses existing sensors for vehicles to simplify the configuration thereof.

The odometer sensor 52 detects the condition when the car is driven about a specific distance such as 1000, 5000 or 1000 km, wherein the specific distance is designed for maintenance reference. The odometer sensor 52 detects the driven distance of the car being 200–500 km (a specific buffer range) before, for example, 1000 km and alarms the user for maintenance. The odometer sensor 52 also informs the console 6 through the processor 11. The console 6 anticipates a maintenance date for the car and inform the date to the user. Alternatively, the workman of the console 6 can inform the car owner through voice transmission.

The console 6 informs the maintenance date of the car to one of the maintenance factories 62, 63, 64, 65, 66 and 67. For example, if the car owner selects the maintenance factory 62 for maintenance, the maintenance factory 62 also informs the selection to the console 6. Moreover, the console 6 also informs other factories to regularize the workload of those factories. Moreover, those factories have same type of processor as that of the console 6.

The vehicle communication unit 1 has a memory for temporarily storing the distance for maintenance and compared the distance with the data in the odometer sensor 52. The distance for maintenance is also shown on a display for car owner's reference.

When the brake lining is almost used up, an alarming light is activated for alarming car owner and an alarm signal is sent to the vehicle communication unit 1 for informing the console 6. The console 6 informs this condition to car owner instantly.

The temperature sensor 55, the car speed sensor 56, and the engine rotation speed sensor 57 use existing sensor for vehicle for simplifying implementation of the present invention. For example, when the temperature sensor 55 detects an over-high temperature and the car speed sensor 56 detects an over-high speed, the console 6 is informed and notifies the car owner for check. Moreover, the processor 11 receives signals from the temperature sensor 55 and the car speed sensor 56 when the abnormal conditions occur and sends an alarm signal to the voice unit 14 to generate alarm voice. Moreover, the console 6 can also provide nearby factories for car owner or communicates with the car owner in interactive way.

The car speed sensor 56 is functioned to detect an over-high speed; and can be used with the engine rotation speed sensor 57 to judge whether the ratio between car speed and engine rotation speed is normal. When the engine rotation speed is over high, the clutch or the gearbox of the car may have problem. The data of the car speed sensor 56 and the engine rotation speed sensor 57 are compared through a comparator 567 to evaluate the performance of the transmission system, the clutch and the gearbox of the car.

The ratio of the data measured by the car speed sensor 56 and the engine rotation speed sensor 57 can also be used to judge the tire pressure. If the tire pressure is not enough, the engine rotation speed is high at a normal car speed. Therefore, the situation of insufficient tire pressure can be detected and inform the car owner.

The engine loudness sensor 58 is used to sense the loudness of the car engine, and compares the sensed loudness by a comparator 581. The comparison result is sent to the console 6 and the console 6 will notify the car owner when the sensed loudness is abnormal.

The processor 11 is connected to a GPS receiver 15 and the GPS receiver 15 receives a positioning signal from a satellite. The GPS receiver 15 has only signal-receiving ability and can receive an electronic map with location of maintenance factories. The electronic map is displayed by the display 13 such that the car owner can get the location of the nearest maintenance factory. Moreover, the electronic map can be designed as a navigation map to navigate the car to the nearest maintenance factory. In this case, the GPS receiver 15 still has only signal-receiving ability and does not require a GSM system to provide an interactive communication. Moreover, the GPS receiver 15 can be functioned as a tracer for burglarproof.

The vehicle communication unit 1 can adopt GSM system to provide interactive data and voice communication. Therefore, the vehicle communication unit 1 can provide point-to-point wireless communication without involving the console 6.

Figures 2A, 2B:
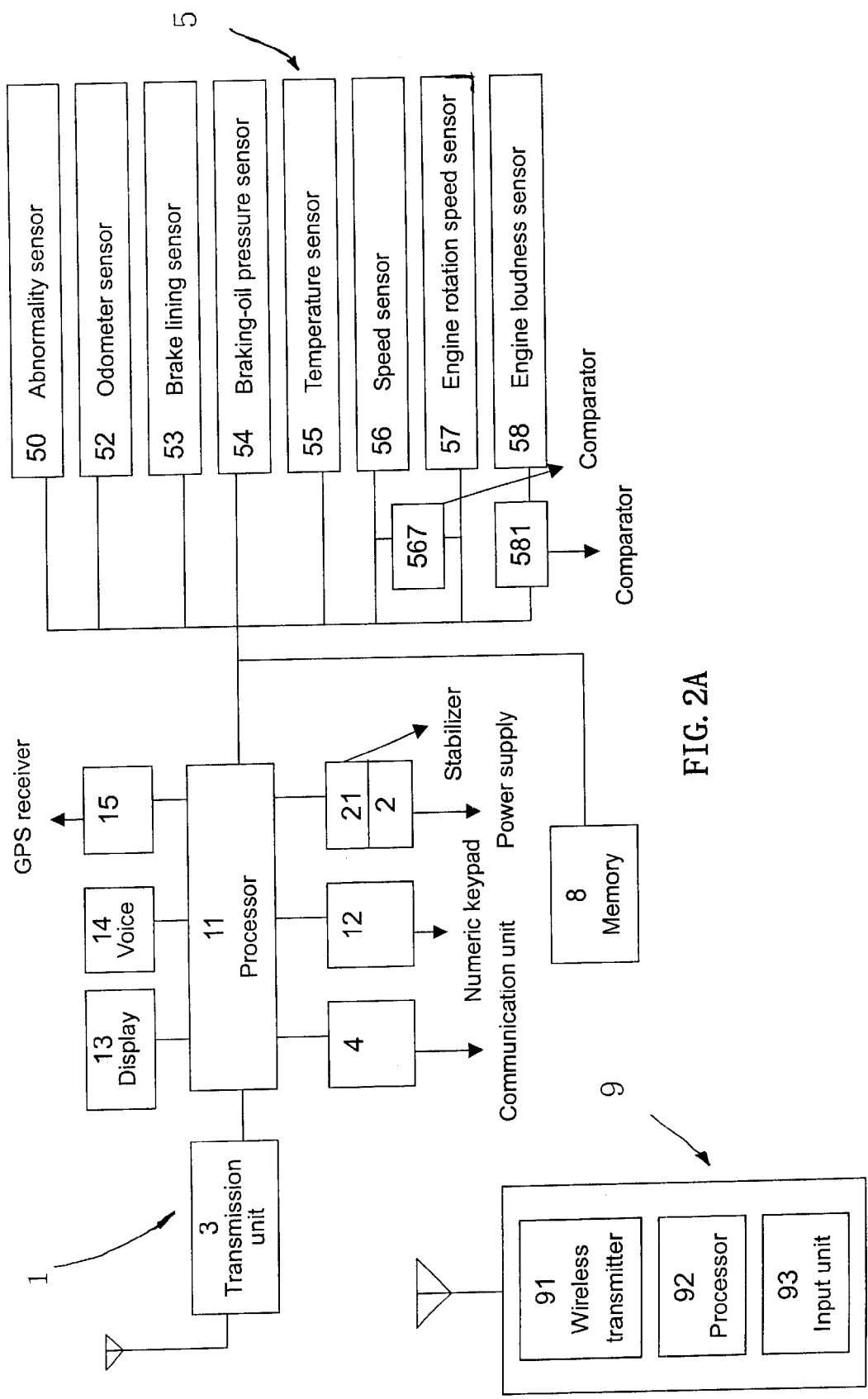
FIG. 2A is a block diagram of another preferred embodiment of the vehicle communication unit of the present invention.
FIG. 2B is a block diagram of a mobile communication device of the present invention.

As shown in FIGS. 2A and 2B, the vehicle communication unit 1 has a mobile communication means 9 portable by user to provide communication between car user and car when the car is parked. When the car is attacked or someone has intention to steal the car, a sensor 50 detects the abnormal situation such as door opening, abnormal starting of engine, or abnormal movement of car and activates the transmission unit 3 to send alarm signal to the mobile communication means 9 for informing the user. Moreover, the transmission unit 3 also sends alarm signal to the console 6 and the transmission unit 3 may use different frequency bands to send signal to different parties. As shown in FIG. 2B, the mobile communication means 9 comprises an input unit 93, a processor 92 and a wireless transmitter 91. The car owner can send command from the input unit 93 to lock the door of the car. The input unit 91 has a touch monitor to input command and display monitoring condition.

The sensor set 5 is provided with a memory means 8, which is preferably a memory chip. The memory means 8 records data and parameters measured by the sensor set 5 during the car is driving. When the car has collision accidents or breaks traffic rules, the recorded data and parameters can be used by traffic cop for decision. For example, the data and parameters can include over speed, the turning on of turning lamp and warming lamp etc., or the engine rotation speed vs. car speed and braking pressure vs. car speed or any voice record to function as a black box for airplane. Moreover, the memory means 8 can be set to record the data and parameters measured by the sensor set 5 before 10 minutes when the car is stopped and the memory of the memory means 8 is erasable for repeated usage.

The memory means 8 can be removable interface card and can be mechanically inserted and extracted, or can be transmitted through wireless channel or physical cable. Therefore, the police can read the data for security examination and the memory means 8 can be used to record the data of the policeman for the convenience of the car owner.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An interactive vehicle-security informing and driving-security prompt system, comprising:

a) a vehicle communication unit located in a vehicle and communicating wirelessly with a console at a remote location through a communication server, the vehicle communication unit including a first processor operated through a numeric keypad, a display, a voice device, a sensor set, a communication unit for voice communication, a GPS receiver receiving an electronic map with locations of maintenance factories, a memory device connected to the sensor set, and a first transmission unit for wirelessly sending data to the console, the vehicle communication unit powered by a power supply through a stabilizer, the sensor set including an odometer sensor, a brake lining sensor, a brake fluid pressure sensor, a temperature sensor, a vehicle speed sensor, an engine rotation speed sensor, an abnormality sensor, and an engine loudness sensor with a comparator, the sensed loudness being sent to the comparator and compared with a predetermined value and the comparison result being sent to the console, the data sensed by those sensors being sent to the processor for processing and then sent to the console through the transmission unit of the vehicle communication unit;

b) a console located remotely from the vehicle and including a second transmission unit for wirelessly sending data to the vehicle communication unit, a communication server and data storage device having stored data relating to a plurality of maintenance factories; and, c) a mobile communication device communicating wirelessly with the vehicle communication unit for remotely controlling the vehicle, the mobile communication device including a second processor, an input unit and a wireless transmitter.

* * * * *